United States Patent [19]

Nakamura

[11] Patent Number: 5,050,450
[45] Date of Patent: Sep. 24, 1991

[54] WRIST MECHANISM FOR INDUSTRIAL ROBOT OR THE LIKE

[75] Inventor: Satoru Nakamura, Kobe, Japan

[73] Assignee: Kabushiki Kaisha Kobe Seiko Sho, Kobe, Japan

[21] Appl. No.: 423,979

[22] Filed: Oct. 19, 1989

[30] Foreign Application Priority Data

Jan. 20, 1989 [JP] Japan ................................ 1-12258

[51] Int. Cl.⁵ .................... F16H 37/06; B25J 17/02
[52] U.S. Cl. .................................. 74/665 M; 74/640; 901/29
[58] Field of Search ............... 74/640, 665 M, 479; 901/20, 26, 29

[56] References Cited

U.S. PATENT DOCUMENTS

| | | | |
|---|---|---|---|
| 4,586,868 | 5/1986 | Nakashima et al. | 901/29 X |
| 4,626,165 | 12/1986 | Nakashima et al. | 901/29 X |
| 4,671,732 | 6/1987 | Gorman | 901/29 X |
| 4,683,772 | 8/1987 | Colimitra | 901/29 X |
| 4,704,065 | 11/1987 | Allared | 74/665 A X |
| 4,776,232 | 10/1988 | Beyer | 901/29 X |
| 4,780,047 | 10/1988 | Holt et al. | 901/26 X |
| 4,807,486 | 2/1989 | Akeel et al. | 74/479 |
| 4,913,617 | 4/1990 | Nicholson | 901/29 X |

FOREIGN PATENT DOCUMENTS

| | | |
|---|---|---|
| 0054763 | 6/1982 | European Pat. Off. . |
| 0122942 | 4/1984 | European Pat. Off. . |
| 0133499 | 2/1985 | European Pat. Off. . |
| 0146682 | 7/1985 | European Pat. Off. . |
| 0166001 | 1/1986 | European Pat. Off. . |
| 2717870 | 10/1978 | Fed. Rep. of Germany . |
| 3730873 | 4/1988 | Fed. Rep. of Germany . |
| 2279521 | 2/1976 | France . |
| WO84/01539 | 4/1984 | World Int. Prop. O. ............ 901/29 |

Primary Examiner—Allan D. Herrmann
Assistant Examiner—Benjamin Levi
Attorney, Agent, or Firm—Oblon, Spivak, McClelland, Maier & Neustadt

[57] ABSTRACT

A wrist mechanism for an industrial robot of the type wherein wrist elements make rocking, rocking and revolving motions successively from the driving side to the driven side, which is reduced in quantity of motion transmitting parts and is small in size and light in weight but high in rigidity. The wrist mechanism comprises reduction gears provided at end portions on the joint side of driving side wrist elements which are individually provided in pair and cooperate with driven side wrist elements to constitute wrist joints to be operated by the reduction gears.

2 Claims, 8 Drawing Sheets

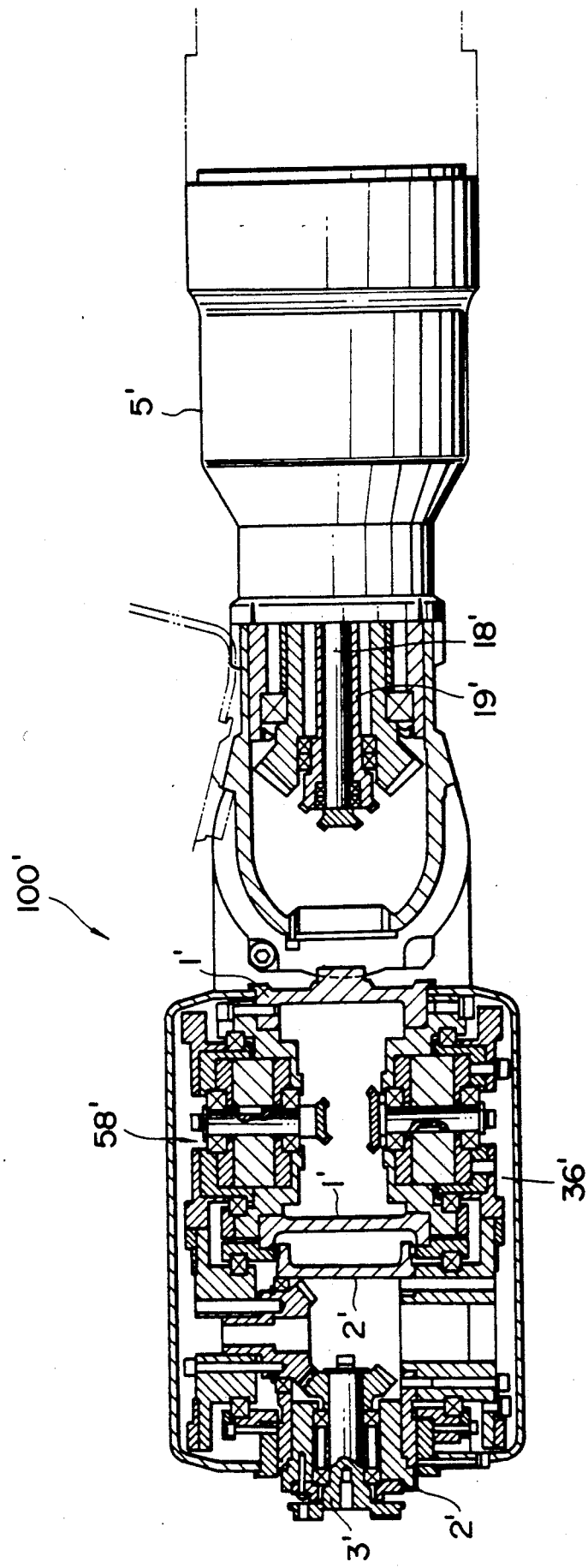

WRIST MECHANISM FOR INDUSTRIAL ROBOT OR THE LIKE

BACKGROUND OF THE INVENTION

1. Field of the Invention

This invention relates to a wrist mechanism for an industrial robot or the like, and more particularly to improvements in or relating to a wrist mechanism for an industrial robot, a manipulator or the like wherein three wrist joints are constructed to make rocking, rocking and revolving motions successively from the driving side.

2. Description of the Related Art

Wrist mechanisms for industrial robots or the like having three wrist joints which are popularly employed are roughly divided into two types including such a type as shown in FIG. 5(a) wherein the three wrist joints of the wrist mechanism 100a make revolving, rocking and revolving motions successively from the driving source 80 side, and such another type as shown in FIG. 5(b) wherein the three wrist joints of the wrist mechanism 100b make rocking, rocking and revolving motions successively from the driving source 80 side.

Such a wrist mechanism 100a of the revolving-rocking-revolving motion type has been widely used because the structure thereof is comparatively simple.

However, where an arm 5a having the driving source 80 built therein and a revolving joint 81a, a first wrist element 1a, a rocking joint 82a, a second wrist element 2a and another revolving joint 83a connected to the arm 5a successively toward the driven side as well as a third wrist element 3a which serves as a tool receiving shaft are positioned on a straight line as viewed on a plane as shown in FIG. 5(a), the first wrist element 1a connected to the driven side of the revolving joint 81a and the third wrist element 3a connected to the driven side of the revolving joint 83a act as shafts which can be driven in the same directions (in the directions indicated by arrow marks 84 and 85 or arrow marks 86 and 87) at the same time.

Therefore, it is difficult to calculate an aimed point or an interpolation point which is necessitated for driving control of the robot, and it is impossible to determine which one of the two wrist elements 1a and 3a should be driven. Accordingly, control of the entire wrist mechanism 100a is disabled.

In order to prevent such an unpredictable and uncontrollable condition from taking place in a range of operation of the wrist mechanism 100a, the wrist mechanism 100a is suitably applied to a robot which is used in such an environment that the robot and a work (object to be worked) remain in a relatively stationary condition, such as where a work remains in a stationary condition or where a work is being transported while the entire robot which is carried, for example, on a bogie is moved to follow the work to reproduce an operation taught to the robot.

To the contrary, in the case of the wrist mechanism 100b of the rocking-rocking-revolving motion type shown in FIG. 5(b), such an uncontrollable region is entered when the rocking joint 82b is rotated at an angle of ±90 degrees so that the arm 5b and the third wrist element 3b are put into parallel positions to the axial directions thereof as shown therein.

However, since the operation at such an angle as mentioned above occurs proximate a terminal end of the range of operation of the wrist mechanism 100b, this does not matter at all practically.

Accordingly, such a wrist mechanism 100b as described above is suitable for processing a work carried by a series of conveyors, for example, for a coating, welding or sealing operation.

Such a wrist mechanism 100b of the rocking-rocking-revolving motion type as described above is disclosed, for example, in Japanese Patent Laid-Open No. 61-25796.

Generally, a backlash which takes place at a mutually meshing location of rotation transmitting parts has a bad influence between a reduction gear and a wrist element producing a "play" which reduced accuracy of the wrist mechanism. Accordingly, a component or components are necessitated for removing a backlash at such a mutually meshing location as described above.

To the contrary, between a driving source and the reduction gear, such backlash is multiplied by a reduction ratio (1/100 to 1/50 times) comparing with that on the wrist element side. Accordingly, the backlash is very small, and the bad influence thereof on operation of the wrist mechanism is comparatively small. Accordingly, countermeasures for removing a backlash at such a mutually meshing location are seldom taken.

As shown in FIGS. 6 to 9, the wrist mechanism 100b shown in FIG. 5(b) includes motors 88, 89 and 90 built therein adjacent a root portion of the horizontal arm 5b for driving the first to third wrist elements 1b, 2b and 3b, respectively. Reduction gears 91, 92 and 93 are disposed adjacent the motors 88, 89 and 90 so as to transmit rotation of the motors 88, 89 and 90 to the wrist elements 1b, 2b and 3b, respectively, at reduced speeds of 1/100 to 1/50.

Here, rotation transmitting routes from the motors 88, 89 and 90 to the wrist elements 1b, 2b and 3b are described in outline. At first as for the first wrist element 1b, high speed rotation of the motor 88 on the horizontal arm side is transmitted to a drive shaft 94 after the speed thereof is reduced by the reduction gear 91, and is further transmitted to the wrist side by way of a bevel gear wheel pair 95, a transmitting shaft 96 and a gear wheel 97 and then by way of a chain 98. Then, the rotation is transmitted to a gear wheel 99 on the wrist side so that the first wrist element 1b on which the gear wheel 99 is securely mounted is rocked in a direction perpendicular to the plane of FIG. 6.

Similarly, as for the second wrist element 2b, rotation of the motor 89 is transmitted to a gear wheel 101 by way of the reduction gear 92 and so forth and then transmitted by way of a chain 102 as well as gear wheels 103, 104, 105 and 106 to a bevel gear wheel pair 107. The rotation is further transmitted to a gear wheel 109 by way of a gear wheel 108 so that the second wrist element 2b on which the gear wheel 109 is securely mounted is rocked in a direction perpendicular to the plane of FIG. 7.

Further, as for the third wrist element 3b, rotation of the motor 90 reduced in speed by the reduction gear 93 is transmitted successively to a gear wheel 110, a chain 111 and another gear wheel 112 and further transmitted to a bevel gear wheel pair 116 by way of gear wheels 113, 114 and 115. Then, the rotation is transmitted to a bevel gear wheel pair 119 by way of gear wheels 117 and 118 so that the third wrist element 3b on which one of the bevel gear wheels of the bevel gear wheel pair 119 is securely mounted is revolved.

Such a wrist mechanism 100b for an industrial robot or the like as described above is superior in that a high degree of positioning accuracy can be attained because the mechanisms for driving the wrist elements are all controlled to make circular motions.

However, in such a conventional wrist mechanism for an industrial robot or the like as described above, reduction gears are disposed proximate motors adjacent a root portion of a horizontal arm and remote from the wrist mechanism. Further, power transmitting parts between the reduction gears and wrist elements are required to have a high strength so that they may withstand high torque, and besides a large number of parts are required because a component or components for removing a backlash are required. Accordingly, the conventional wrist mechanism is disadvantageous in that the wrist mechanism and the horizontal arm are increased in size and weight and that the mechanical rigidity is low.

SUMMARY OF THE INVENTION

It is an object of the present invention to provide a wrist mechanism for an industrial robot of the type wherein wrist elements make rocking, rocking and revolving motions successively from the driving side to the driven side, which has fewer motion transmitting parts and is small in size and light in weight but high in rigidity.

In order to attain the object according to the present invention, there is provided a wrist mechanism for an industrial robot, in which the wrist mechanism includes a first wrist element rotatably mounted to a robot arm at a first joint, a second wrist element rockably mounted at a second joint and a third wrist element rockably mounted at a third joint. Drive means are provided for driving each of the first, second and third wrist elements at the respective first, second and third joints. Each of the first, second and third joints comprises one of the arm and the first and second wrist elements as a driving side element and one of the first, second and third wrist elements as a driven side element. The drive means includes a reduction gear means for each of the first, second and third joints, each of the reduction gear means being mounted at a driving side element side of each of the first, second and third joints.

With the wrist mechanism for an industrial robot or the like, if one of motors located adjacent a root portion of a horizontal arm of the robot is energized, then rotation of the motor is transmitted at a low torque to the wrist mechanism at an end of the horizontal arm by way of transmitting members such as a gear wheel and a chain.

Thereupon, the rotation is transmitted to a corresponding one of the reduction gears provided at an end portion on the wrist joint side of the driving side wrist element which is provided in pair and cooperates with the driven side wrist element to constitute the wrist joint to be operated by the reduction gear.

The rotation is thus reduced in speed and increased in torque by the reduction gear and then transmitted to the driven side wrist element connected directly or indirectly by way of a small number of transmitting parts to a driven shaft of the reduction gear to operate the driven side wrist element.

Since rotation to be transmitted to a driven side wrist element is transmitted at a low torque to a location proximate the driven side wrist element in this manner, no transmitting part of a high strength is required. Further, since each of the reduction gears is disposed proximate a corresponding one of the wrist elements, the quantity of components for removing a backlash can be reduced. Accordingly, the horizontal arm and the wrist elements can be reduced in size and weight. As a result, the mechanical rigidity of the horizontal arm and the wrist elements can be increased, and the capacity of each driving source can be reduced.

The above and other objects, features and advantages of the present invention will become apparent from the following description and the appended claims, taken in conjunction with the accompanying drawings.

BRIEF DESCRIPTION OF THE DRAWINGS

FIG. 4 is a side elevational sectional view of the wrist mechanism of FIG. 3;

DETAILED DESCRIPTION OF THE PREFERRED EMBODIMENTS

Figure 1:
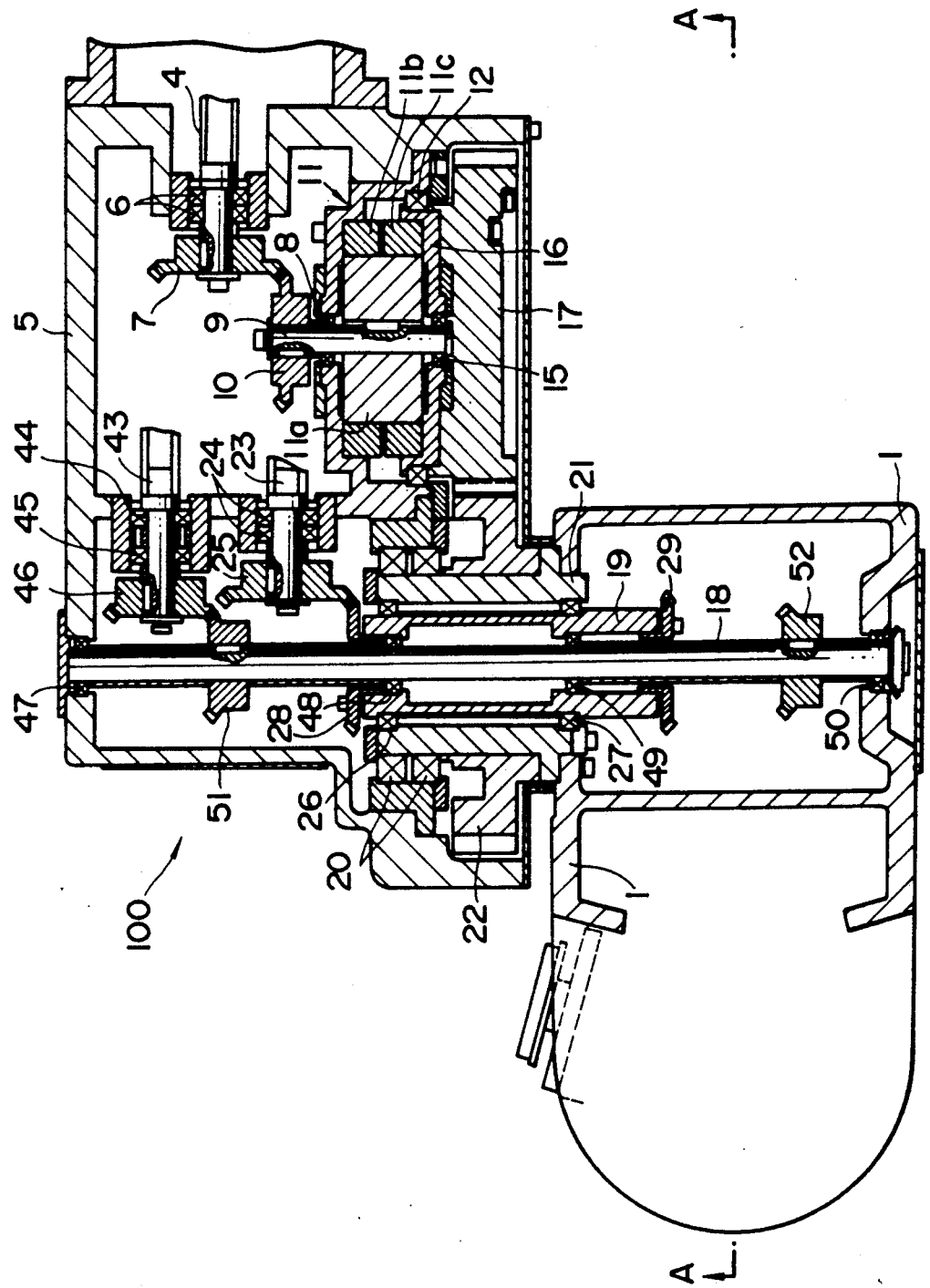
FIG. 1 is a side elevational sectional view of a wrist mechanism showing a preferred embodiment of the present invention.
Figure 2:
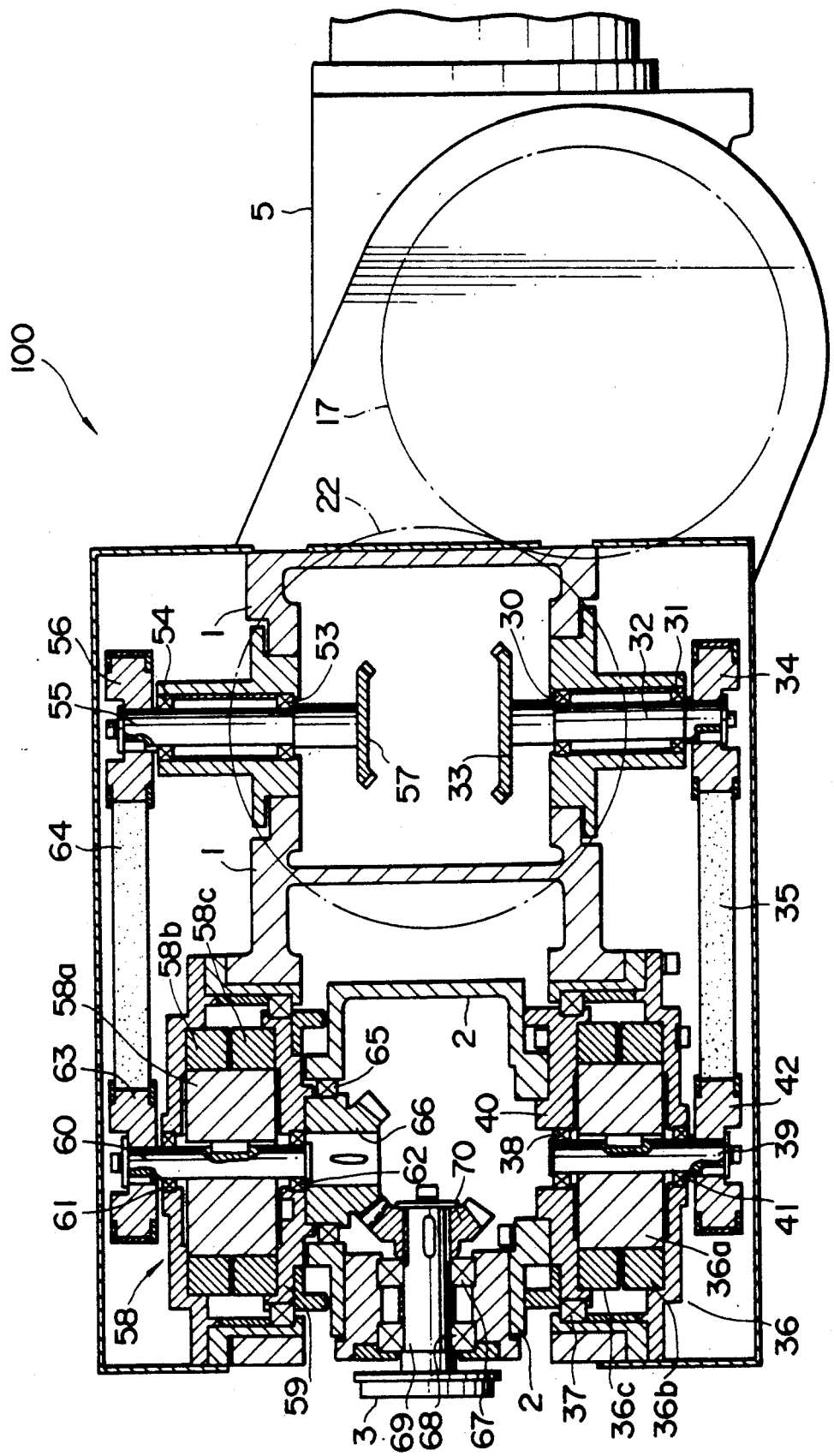
FIG. 2 is a sectional view taken along line A—A of FIG. 1.

Referring first to FIGS. 1 and 2, there is shown a wrist mechanism for an industrial robot or the like according to the present invention. The wrist mechanism generally denoted at 100 has drive means including a drive shaft 4 connected to a rocking motor (not shown) for an elongate first wrist element 1 and supported for rocking, about an axis perpendicular to the direction of elongation of the wrist element, on a horizontal arm 5 by means of a bearing 6 mounted at an end of the horizontal arm 5. A bevel gear wheel 7 is securely mounted at an end of the drive shaft 4 and held in meshing engagement in a perpendicular relationship with another bevel gear wheel 10 which is securely mounted at an end of a transmission shaft 9 supported for rotation on the horizontal arm 5 by means of a bearing 8. The other end of the transmission shaft 9 is securely connected to a driving disk 11a of a known harmonic drive reduction gear 11 (produced by Harmonic Drive Systems Inc., trade mark, hereinafter referred to simply as reduction gear). A fixed side outer gear wheel 11b of the reduction gear 11 is securely mounted on the horizontal arm 5 while a driven side outer gear wheel 11c is supported for rotation on the transmission shaft 9 by means of a bearing 15 and securely mounted on an end face of a rotation transmitting disk 16 which is supported at the outer diameter side thereof for rotation on the horizontal arm 5 by means of a bearing 12. The rotation transmitting disk 16 has a gear wheel 17 securely mounted on the other end face thereof. The gear wheel 17 is held in meshing engagement with another gear wheel 22 securely mounted on a hollow shaft 21 which is supported for rotation on the horizontal arm 5 side by means of a bearing 20 and is made hollow along an axis thereof so that a transmitting shaft 18 and another hollow shaft 19 may extend axially therethrough. The first wrist element 1 to be rocked is securely mounted at an end of the hollow shaft 21 adjacent the reduction gear 11 on the driven side of the hollow shaft 21. The first wrist element 1 is disposed such that the length thereof extends perpendicularly to the hollow shaft 21.

A drive shaft 23 is connected to a rocking motor (not shown) as part of the drive means for a second wrist element 2 and supported for rotation on the horizontal arm 5 by means of a bearing 24. A bevel gear 25 is mounted at an end of the drive shaft 23 and held in meshing engagement in a perpendicular relationship with another bevel gear wheel 28 securely mounted at an end of the hollow shaft 19 which is supported for rotation in a coaxial relationship in the hollow shaft 21 by means of a pair of bearings 26 and 27 disposed on the inner bore side of the hollow shaft 21. A bevel gear wheel 29 is securely mounted at the other end of the hollow shaft 19 and held in meshing engagement in a perpendicular relationship with another bevel gear wheel 33 securely mounted at an end of a connecting shaft 32 which is supported for rotation on the first wrist element 1 by means of a pair of bearings 30 and 31. A pulley 34 is securely mounted at the other end of the connecting shaft 32, and a timing belt 35 extends around the pulley 34. Thus, when the connecting shaft 32 is rotated, the rotation is transmitted by way of the pulley 34 and the timing belt 35 toward an end of the first wrist element 1. A reduction gear 36 for transmitting rotation of the rocking motor at a reduced speed toward the second wrist mechanism 2 is disposed at the end of the first wrist element 1. A fixed side outer gear wheel 36b of the reduction gear 36 is securely mounted on the first wrist element 1 while a driven side outer gear wheel 36c is securely mounted on an end face side of a rotation transmitting disk 40 in the form of a hollow disk which is supported at the outer diameter side thereof for rotation on the first wrist element 1 by means of a bearing 37. A transmitting shaft 39 is supported for rotation on the inner bore side of the rotation transmitting disk 40 by means of a bearing 38. The transmitting shaft 39 is further supported at an outer end portion thereof for rotation on the first wrist element 1 by means of a bearing 41 and has a pulley 42 mounted at the end thereof. The timing belt 35 extends around the pulley 42. A driving disk 36a of the reduction gear 36 is securely mounted at an intermediate portion on the driven side of the transmitting shaft 39. The other end face side of the rotation transmitting disk 40 is securely mounted on the second wrist element 2. The rotation transmitting disk 40 is disposed such that an axis of rotation thereof extends in a concentrical relationship with the transmitting shaft 39 but in a perpendicular relationship to an axis of the second wrist element 2.

A drive shaft 43 is connected to a revolving motor (not shown) as part of the drive means for the third wrist element 3 and supported for rotation on the horizontal arm 5 by means of a pair of bearings 44 and 45. A bevel gear wheel 46 is securely mounted at an end of the drive shaft 43. The connecting shaft 18 is supported for rotation at an end thereof on the horizontal arm 5 by means of a bearing 47, at a substantially mid portion thereof on the hollow shaft 19 by means of a pair of bearings 48 and 49, at at the other end thereof on the first wrist element 1 by means of a bearing 50. The connecting shaft 18 has a bevel gear wheel 51 securely mounted on the driving side thereof and another bevel gear wheel 52 securely mounted on the driven side thereof. The bevel gear wheel 51 is held in meshing engagement in a perpendicular relationship with the bevel gear wheel 46. A connecting shaft 55 is supported for rotation on the first wrist element 1 by means of a pair of bearings 53 and 54 and has a pulley 56 securely mounted at an end thereof. A bevel gear wheel 57 is securely mounted at the terminal end of the connecting shaft 55 and held in meshing engagement in a perpendicular relationship with the bevel gear wheel 52. A fixed side outer gear wheel 58b of a reduction gear 58 is mounted at the end of the first wrist mechanism 1 while a driven side outer gear wheel 58c of the reduction gear 58 is securely mounted on a rotation transmitting disk 59 in the form of a hollow disk. A transmitting shaft 60 of the reduction gear 58 is supported for rotation on the first wrist element 1 by means of a bearing 61 and on the inner bore side of the rotation transmitting disk 59 by means of a bearing 62. A pulley 63 is securely mounted at an end of the transmitting shaft 60 and connected to the pulley 56 by way of a timing belt 64. A bevel gear wheel 66 is supported for rotation on the second wrist element 2 by means of a bearing 65 and securely mounted at an end portion on the driven side of the transmitting shaft 60. The bevel gear wheel 66 is held in meshing engagement in a perpendicular relationship with another bevel gear wheel 70 securely mounted on a connecting shaft 69 which is supported for rotation on the second wrist element 2 by means of a pair of bearings 67 and 68 and intergrated with the third wrist element 3. A tool such as a coating gun for coating, welding or sealing operation or a welding torch is mounted at an end of the third wrist element 3.

The wrist mechanism 100 for an industrial robot or the like has such a construction as described above. In operation, when the rocking motor for the first wrist element 1 is driven to rotate the drive shaft 4, the high speed rotation of the drive shaft 4 is transmitted to the transmitting shaft 9 by way of the bevel gear wheel 7 securely mounted at the end of the drive shaft 4 and the bevel gear wheel 10 held in meshing engagement with the bevel gear wheel 7. Rotation of the driving disk 11a of the reduction gear 11 securely mounted on the transmitting shaft 9 is transmitted at a reduced speed to the driven side outer gear wheel 11c of the reduction gear 11 by means of the fixed side outer gear wheel 11b, a flexible spline (not shown) in the form of a flexible ring and the driven side outer gear wheel 11c which constitute the reduction gear 11. Rotation of the driven side outer gear wheel 11c is transmitted to the gear wheel 17 in such a manner as to hold the rotation transmitting plate 16 therebetween and then to the hollow shaft 21 by way of the gear wheel 22 held in meshing engagement with the gear wheel 17. Consequently, the first wrist element 1 securely mounted at the end of the hollow shaft 21 is rocked at a low speed.

To the contrary, when the rocking motor for the second wrist element 2 is energized to rotate the drive shaft 23, the rotation is transmitted to the hollow shaft 19 by way of the bevel gear wheels 25 and 28 and then to the bevel gear wheel 29 securely mounted at the end of the hollow shaft 19. The connecting shaft 32 is thus rotated at a high speed by way of the bevel gear wheel 33 held in meshing engagement with the bevel gear wheel 29, and the rotation of the connecting shaft 32 is transmitted successively to the pulley 34, timing belt 35 and pulley 42 and then to the transmitting shaft 39 on which the pulley 42 is securely mounted. Then, high speed rotation of the driving disk 36a of the reduction gear 36 securely mounted on the transmitting shaft 39 is reduced by the reduction gear 36 so that the rotation transmitting disk 40 is rotated at a low speed. Consequently, the second wrist element 2 securely mounted on the rotation transmitting disk 40 is rocked at a low speed.

On the other hand, when the revolving motor for the third wrist element 3 is energized, rotation thereof is transmitted to the driving shaft 43 so that the gear wheel 46 securely mounted at the end of the driving shaft 43 is rotated. Then, the bevel gear wheel 51 held in meshing engagement with the bevel gear wheel 46 is rotated, and the rotation is transmitted to the connecting shaft 18 and further to the connecting shaft 55 by way of the bevel gear wheels 52 and 57. Rotation of the pulley 56 securely mounted at the end of the connecting shaft 55 is transmitted to the transmitting shaft 60 by way of the timing belt 64 and the pulley 63. High speed rotation is thus transmitted to the driving disk 58a of the reduction gear 58 and reduced in speed by the reduction gear 58, and the reduced speed rotation is transmitted from the rotation transmitting disk 59 to the bevel gear wheel 66 securely mounted on the rotation transmitting wheel 59. Consequently, the connecting shaft 69 which is intergrated with the third wrist element 3 and has the bevel gear wheel 70 securely mounted at the end thereof and held in meshing engagement with the bevel gear wheel 66 is revolved at a low speed.

With the wrist mechanism of the embodiment described above, since the three wrist joints of the wrist elements thereof make rocking, rocking and revolving motions successively from the driving side and the reduction gears are individually disposed adjacent the wrist elements to be driven by them, rotation of the driving sources can be transmitted with a low torque to locations near the wrist elements. Further, since rotation of the driving sources is reduced in speed immediately before the corresponding wrist elements, it is transmitted to the wrist elements after irregularities in high speed rotation or plays between rotation transmitting parts are reduced, and accordingly, the positioning accuracy of the wrist elements is improved.

Here, while the axis of the wrist mechanism of the present embodiment is disposed in an eccentric relationship with respect to the axis of the horizontal arm, they may be disposed in a concentrical relationship.

Figure 3:
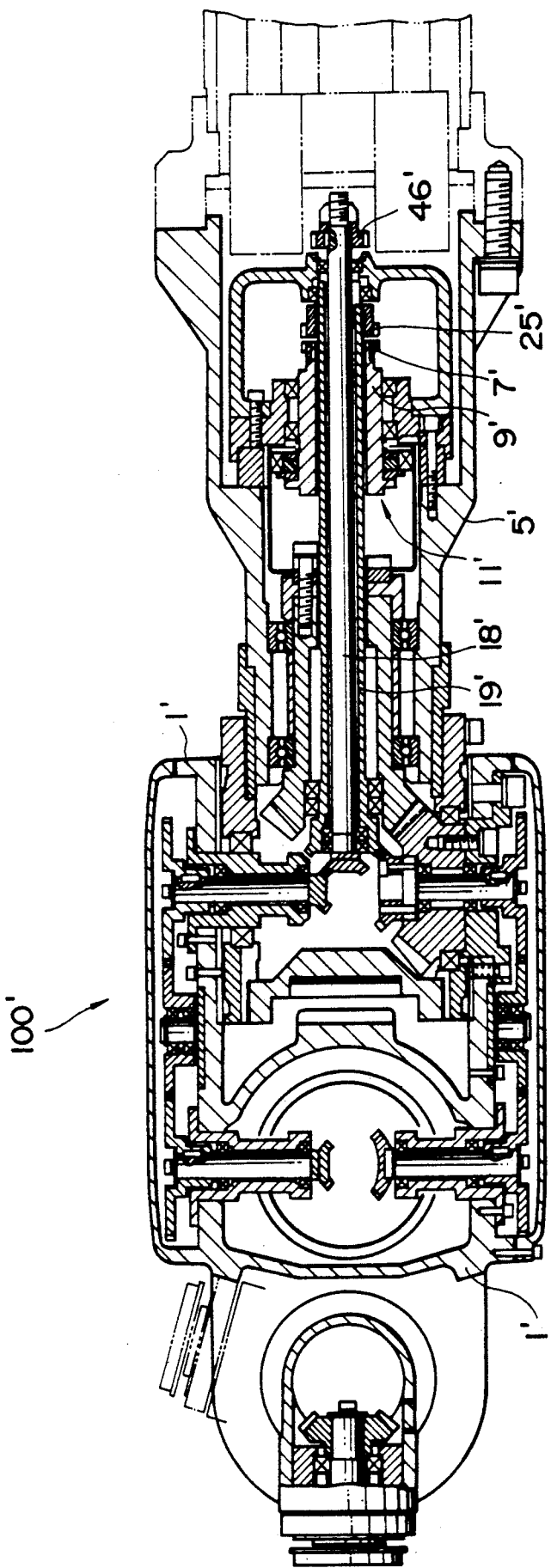
FIG. 3 is a horizontal sectional view of a wrist mechanism showing another preferred embodiment of the present invention.
Figure 5A:
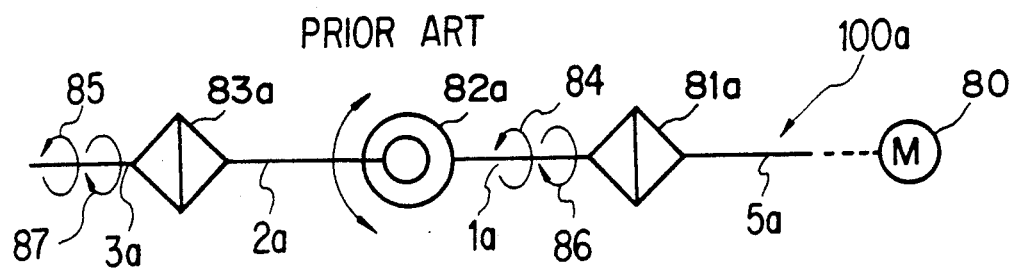
FIGS. 5(a) and 5(b) are diagrammatic representations showing a revolving-rocking-revolving motion type wrist mechanism and a rocking-rocking-revolving motion type wrist mechanism, respectively.
Figure 5B:
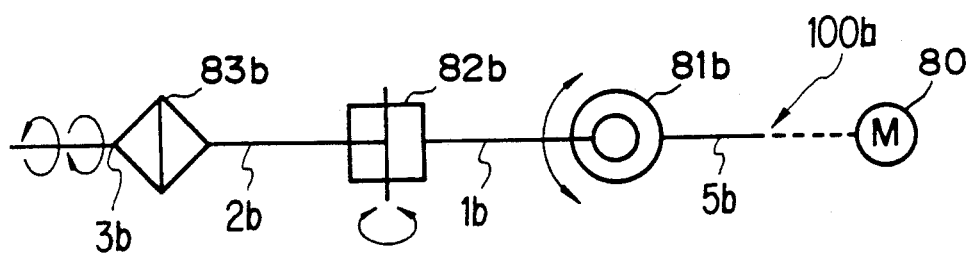
Figure 6:
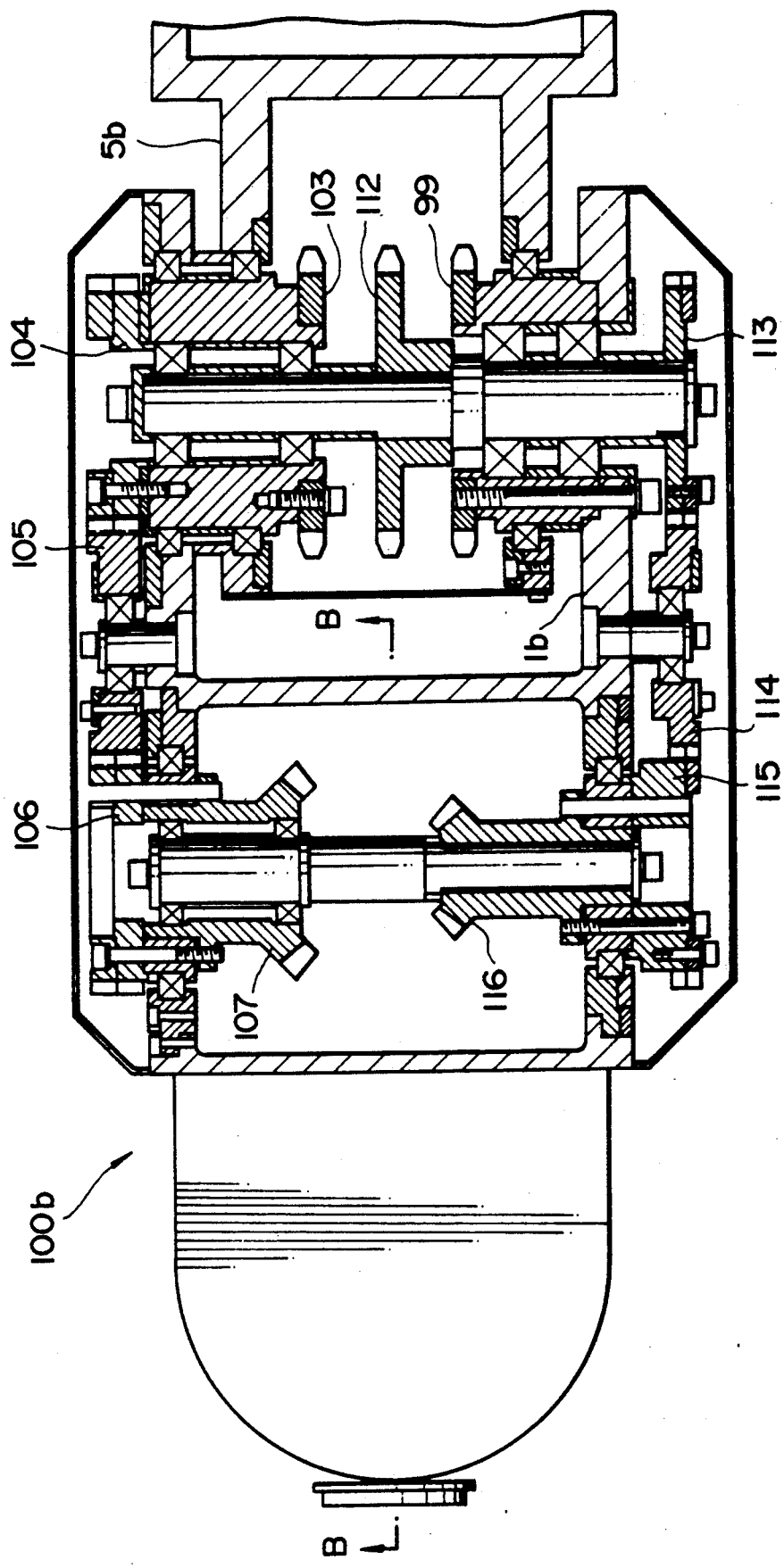
FIG. 6 is a horizontal sectional view showing an exemplary conventional wrist mechanism.
Figure 7:
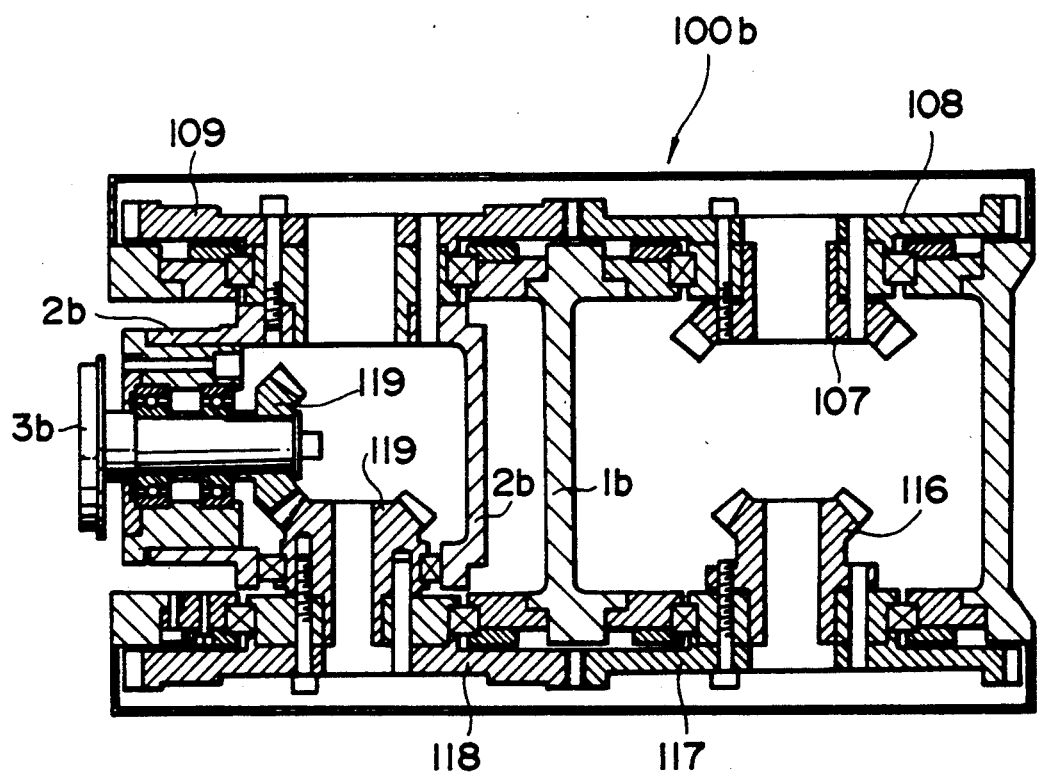
FIG. 7 is a sectional view taken along line B—B of FIG. 6.
Figure 8:
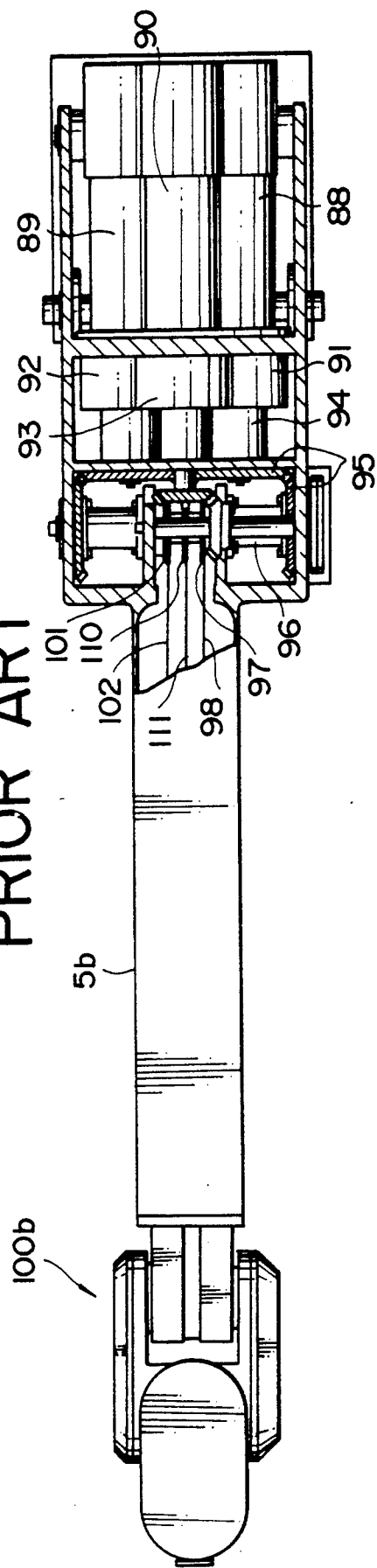
FIG. 8 is a plan view, partly in section, of the wrist mechanism of FIG. 6 and a horizontal arm provided with the wrist mechanism.
Figure 9:
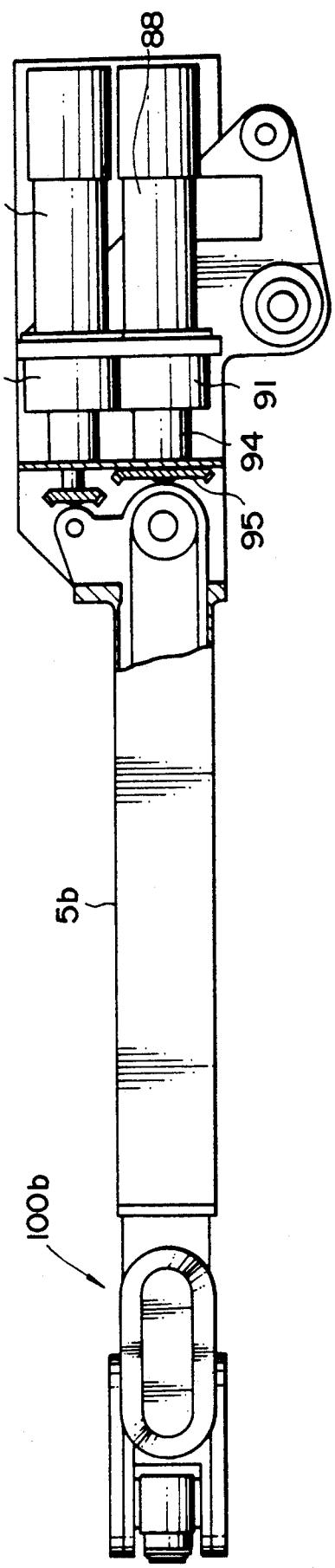
FIG. 9 is a side elevational view, partly in section, of the wrist mechanism and the horizontal arm shown in FIG. 8.

Such arrangement is involved in a wrist mechanism 100' according to another preferred embodiment of the present invention which is shown in FIGS. 3 and 4. In FIGS. 3 and 4, like parts or elements are denoted by like reference numerals to those of the embodiment shown in FIGS. 1 and 2 but with a suffix' applied thereto.

The wrist mechanism 100' is different from the wrist mechanism 100 of the preceding embodiment in that transmitting shafts 9' (hollow shaft), 19' (hollow shaft) and 18' for transmitting rotation from corresponding motors (not shown) to drive wrist elements 1',2' and 3', respectively, and a horizontal arm 5' are disposed all in a concentrical relationship.

Here, gear wheels 7', 25' and 46' are securely mounted at end portions of the transmitting shafts 9', 19' and 18', respectively, on the horizontal arm 5' side for transmitting rotation from drive shafts (not shown) connected to the corresponding motors. Reduction gears 11', 36' and 58' are provided for reducing the speed of rotation to be transmitted toward the first wrist element 1', second wrist element 2' and third wrist element 3' in this order, respectively.

The wrist mechanism 100' having such a construction as described above has a more compact configuration than the wrist mechanism 100 of the preceding embodiment described hereinabove. It is to be noted that description of operation of the wrist mechanism 100' is omitted herein because it is substantially similar to that of the wrist mechanism 100 of the preceding embodiment.

It is to be noted that while in the present embodiment pulleys and a timing belt is employed as part of a rotation transmitting means, a harmonic drive reduction gear is employed as a speed reducing means and bevel gear wheels are employed as a meshing transmitting means, those means are not limited to the specific elements and may be composed of some other suitable elements than the specific elements.

Having now fully described the invention, it will be apparent to one of ordinary skill in the art that many changes and modifications can be made thereto without departing from the spirit and scope of the invention as set forth herein.

What is claimed is:

1. A wrist mechanism for an industrial robot, comprising:
    a first wrist element rockably mounted to a robot arm at a first wrist joint;
    a second wrist element rockably mounted at a second wrist joint;
    a third wrist element rotatably mounted at a third wrist joint;
    drive means for driving each of said first, second and third wrist elements at said respective first, second and third wrist joints,
    wherein each of said first, second and third wrist joints comprises one of said arm and said first and second wrist elements, respectively, as a driving side element and one of said first, second and third wrist elements, respectively, as a driven side element, and wherein said drive means includes a reduction gear means for each of said first, second and third joints, each of said reduction gear means being mounted at a driving side element side of one of said first, second and third wrist joints,
    wherein said first wrist joint comprises:
        an arm;
        an elongate wrist element;
        a hollow shaft rockably mounted said elongate wrist element on said arm about an axis perpendicular to the direction of elongation of said elongate wrist element;
        a gear wheel mounted to said hollow shaft, said gear wheel being driven by the reduction gear means of said first joint;
        concentric shafts mounted in said hollow shaft and along said axis; and
        bevel gears mounted on said hollow shaft.

2. The wrist mechanism of claim 1 wherein said reduction gear means for each of said first, second and third wrist joints includes a harmonic drive reduction gear.

* * * * *